R. R. HARDY.
SUPPORT.
APPLICATION FILED SEPT. 11, 1919.
1,330,318. Patented Feb. 10, 1920.
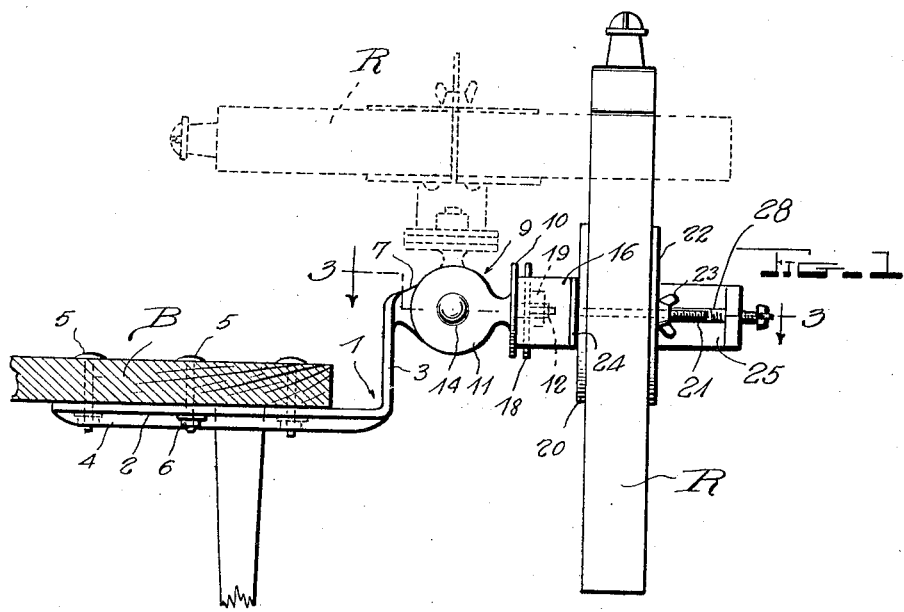
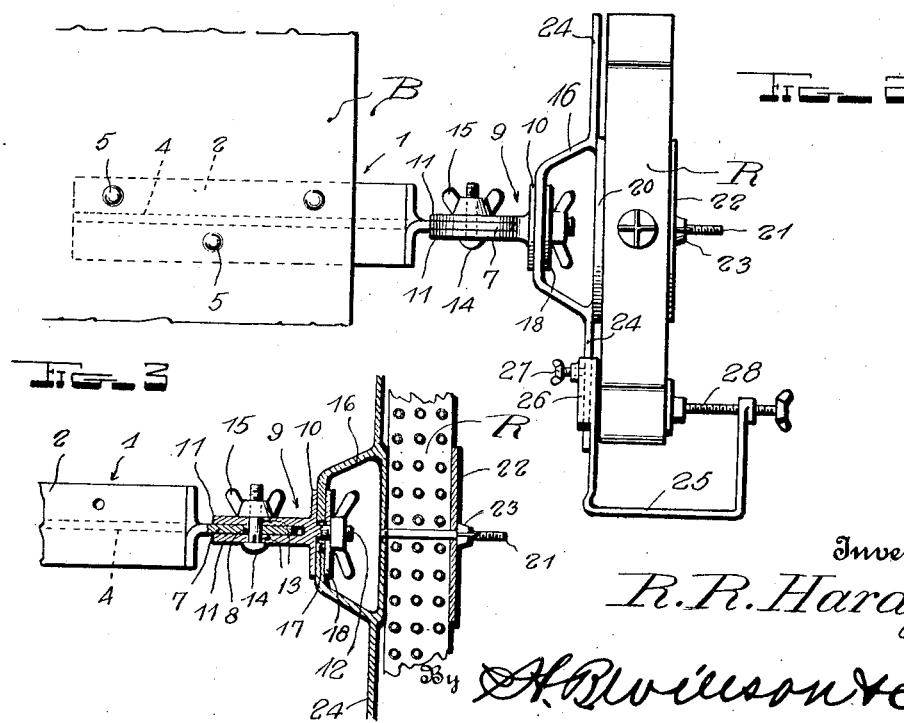
Inventor
R. R. Hardy
By H. B. Willson & Co.
Attorneys

UNITED STATES PATENT OFFICE.

ROBERT ROSS HARDY, OF LITTLE ROCK, ARKANSAS.

SUPPORT.

1,330,318.  Specification of Letters Patent.  Patented Feb. 10, 1920.

Application filed September 11, 1919. Serial No. 323,156.

*To all whom it may concern:*

Be it known that I, ROBERT R. HARDY, a citizen of the United States, residing at Little Rock, in the county of Pulaski and State of Arkansas, have invented certain new and useful Improvements in Supports; and I do declare the following to be a full, clear, and exact description of the invention, such as will enable others skilled in the art to which it appertains to make and use the same.

This invention relates to certain new and useful improvements in supports. The primary object of the invention is to provide a supporting device designed to be attached to a work bench to support the radiator of an automobile in various positions so that the radiator can be easily repaired.

Another object of the invention is to provide a device of this character which will be extremely simple, strong, durable and inexpensive in construction, and one which will be well adapted to the purpose for which it is designed.

With these and other objects in view the invention consists of certain novel features of construction, and the combination and arrangement of parts as will be hereinafter fully described and claimed.

In the accompanying drawings in which similar reference characters designate similar parts throughout the several views:

Figure 1 is a side view of the device constructed in accordance with this invention, showing it attached to a work bench, and having an automobile radiator clamped to the same.

Fig. 2 is a top plan view of the device in the position shown in Fig. 1.

Fig. 3 is a horizontal sectional view taken substantially on the line 3—3 of Fig. 1.

Referring more particularly to the drawings, the numeral 1 designates as a whole a bracket which is substantially of L-shaped construction having a long arm 2 and a short arm 3. The long arm 2 is provided with a centrally disposed longitudinally extending rib 4 which serves to strengthen it and has openings arranged on opposite sides of the rib. Through these openings are extended bolts 5 to attach the bracket to the under side of a work bench B. Nuts 6 are disposed upon the lower threaded ends of the bolts 5 to operate in conjunction with the latter. The free end of the short arm 3 of the bracket is twisted into a plane disposed at right angles to the plane occupied by said short arm and then bent laterally and outwardly and enlarged. This enlarged portion 7 is provided with a central aperture 8.

The numeral 9 designates as a whole a head. This head is composed of a disk-like base portion 10, a pair of spaced circular ears 11 extending at right angles from the side of the base portion, and a threaded lug 12 extending at right angles from the center of the other side of the base portion. The two ears 11 are provided with registering apertures 13. The head is disposed with the ears 11 arranged on opposite sides of the enlargement 7 of the bracket and with the apertures 13 alined with the aperture 8. A bolt 14 is then inserted through the alined apertures with its head contacting with one of the ears 11, and a wing nut 15 is threaded upon the bolt so that it bears against the other ear and holds the head in clamped relation with respect to the bracket. However, when the nut 15 is loosened the head may be swung angularly with respect to the bracket.

The numeral 16 represents a U-shaped member, the intermediate portion of which is provided with an aperture 17 through which is extended the aforementioned lug 12, so that this intermediate portion has one side bearing against the disk-like base 10 of the head 9. Inserted upon the lug 12 and bearing against the other side of the intermediate portion of the member 16 is a clamping disk 18, the latter in conjunction with the base 10 holding the member 16 in clamped relation by means of the pressure exerted by a nut 19 threaded upon the lug 12. By loosening the nut 19 the member 16 may be adjusted axially with respect to the head 9.

Integrally secured to the ends of the U-shaped member 16 is a supporting plate 20, the latter being of any suitable configuration but being preferably circular. Extended outwardly from the central portion of the plate 20 is a bolt, screw or rod 21 having an outer threaded end. This rod 21 is adapted to receive a clamping disk 22 and a wing nut 23.

The numerals 24 represent arms which are jointed integrally with the ends of the U shaped member 16 at the junctions of said ends with the plate 20. These arms 24 extend outwardly in opposite directions from the plate 20 and either one of them may be used in connection with a C-shaped clamp 25, one end of which is provided with a sleeve 26 fitting upon one of the arms 24 and maintained thereon by a set screw 27, and the other end of the clamp 25 carries an inwardly extending clamping screw 28.

In using the device the bracket 1 is secured to the work bench in the manner described, and the disk 22 and nut 23 are removed from the rod 21. An automobile radiator R is then placed with one of its sides contacting with the supporting plate 20 and with the rod 21 extending transversely through the radiator. The disk 22 is then inserted upon the rod 21 and moved into clamping engagement with the radiator by tightening the wing nut 23. If desired the clamping screw 28 may be brought to bear against the radiator. The head 9 may be swung so that the radiator may be disposed in a vertical, a horizontal, or any other angular position necessary to easily accomplish the desired repairing by first loosening the wing nut 15. After the adjustment has been made the wing nut 15 is to be tightened to lock the parts in adjusted positions.

From the foregoing description, taken in connection with the accompanying drawings, the construction and use of the invention will be readily understood.

This support can also be used and will be used as an engine block or motor holder.

Various changes in form, proportion, and in the minor details of construction may be resorted to without departing from the spirit of the invention as defined in the claims.

What is claimed is:

1. A device of the class described comprising a bracket having means for attachment to a support, a head hinged to said bracket and adjustable angularly with respect to the same, a supporting plate, a U-shaped member secured at its ends to said supporting plate and having its intermediate portion clamped for axial adjustment to said head, and clamping means carried by said plate.

2. A device of the class described comprising a bar having means for attachment to a support, one end of said bar being provided with an enlargement, a head having a disk-like base portion and a pair of spaced ears extending at right angles from one side of the latter, said ears being disposed on opposite sides of the enlargement of said bar, a bolt extending through said ears and the enlargement of said bar to allow said head to be adjusted angularly with respect to the latter, a nut disposed upon said bolt for maintaining said ears and the enlargement of said bar in clamped relation, a threaded lug extending from the other side of the base portion of said head, a U-shaped member having an aperture in its intermediate portion through which said lug is extended, said member having one side bearing against the last named side of the base portion of said head, a disk disposed upon said lug and bearing against the other side of said member, a nut disposed upon said lug for clamping said member between said disk and the base portion of said head, a supporting plate secured to the ends of said member, and clamping means carried by said supporting plate.

3. A device of the class described comprising a bracket having means for attachment to a support, a supporting plate mounted upon said bracket, a rod extending outwardly from said plate, a clamping disk mounted on said rod near the free end thereof, an arm extending outwardly from one edge of said plate, and a C-shaped clamp removably and adjustably mounted upon said arm.

In testimony whereof I have hereunto set my hand.

ROBERT ROSS HARDY.